April 5, 1949. A. R. CURIONI 2,466,386
SEGREGATING AND WEIGHING MACHINE
Filed Sept. 25, 1943 2 Sheets-Sheet 1

INVENTOR.
Aldo R. Curioni
BY
Norman N. Holland
ATTORNEY

April 5, 1949.  A. R. CURIONI  2,466,386
SEGREGATING AND WEIGHING MACHINE
Filed Sept. 25, 1943  2 Sheets-Sheet 2
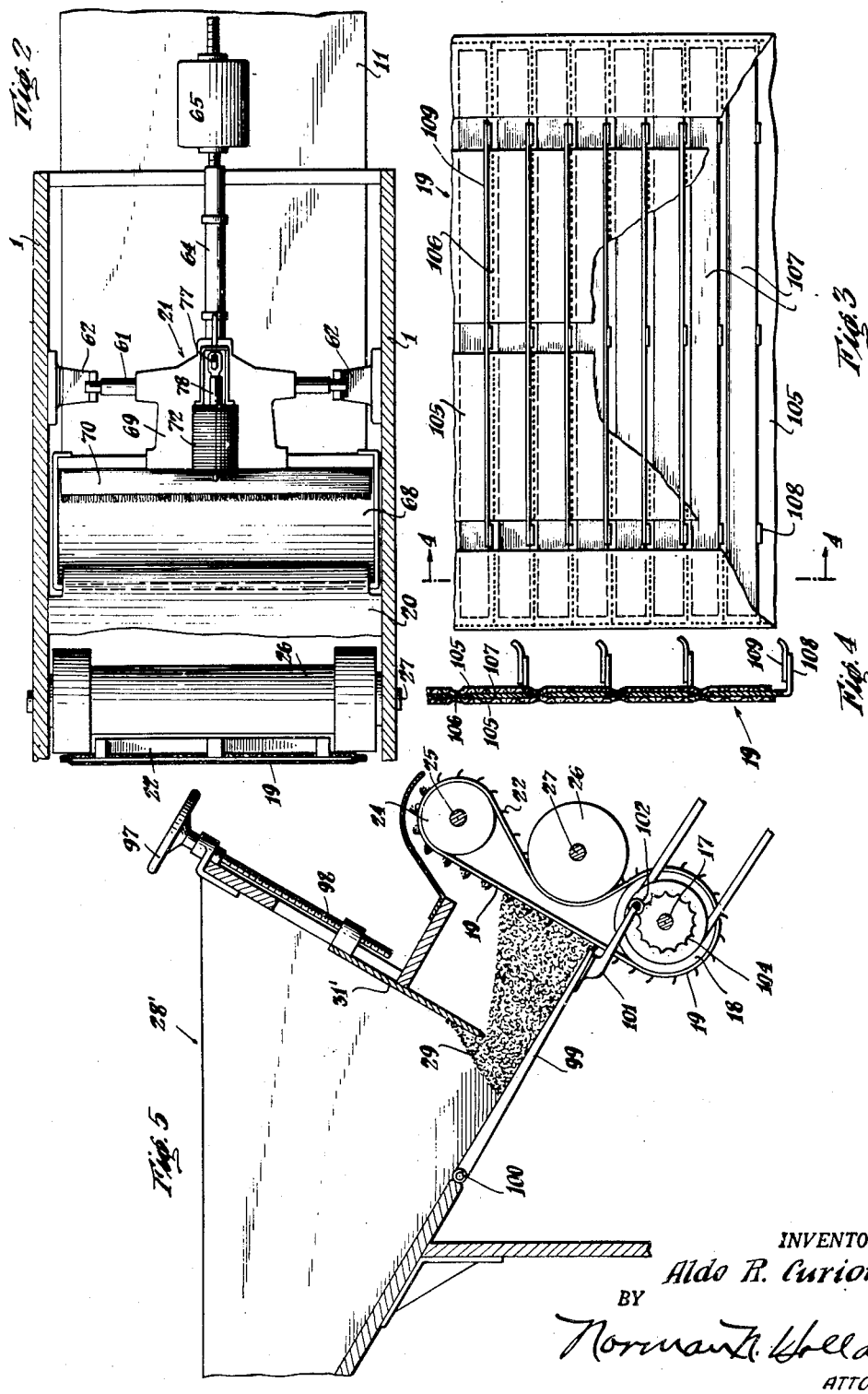
INVENTOR.
Aldo R. Curioni
BY
Norman R. Holland
ATTORNEY Patented Apr. 5, 1949

2,466,386

UNITED STATES PATENT OFFICE 2,466,386

SEGREGATING AND WEIGHING MACHINE

Aldo R. Curioni, New York, N. Y., assignor to Sarioni Company, Inc., New York, N. Y., a corporation of New York Application September 25, 1943, Serial No. 503,861

6 Claims. (Cl. 198—52)

The present invention relates to devices for weighing and packaging macaroni and similar products and more particularly to an improved machine for segregating and weighing predetermined quantities thereof.

Macaroni and similar products are difficult to handle with automatic machinery by reason of their brittle and breakable nature and because of the difficulty in segregating small portions of them. The macaroni tends to clog the machine or to be broken by it. The present invention aims to provide an improved machine for effectively removing macaroni and similar products from a bin or receptacle and segregating predetermined quantities for delivery to packages or to packaging machinery.

An object of the present invention is to provide an improved machine for separating and weighing macaroni and similar products.

Another object of the invention is to provide an improved mechanism for removing the macaroni at a substantially uniform rate from a bin.

Another object of the invention is to provide an improved mechanism for delivery of macaroni to a weighing device.

Another object of the invention is to provide an improved weighing device for macaroni and like products.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

Fig. 2 is a fragmentary sectional view along the line 2—2 of Fig. 1 giving a top plan view of parts of the interior of the machine;

Fig. 3 is a detailed view of an improved conveyor belt;

Fig. 4 is a sectional view along the line 4—4 of Fig. 3 illustrating details of the construction of the conveyor belt; and Fig. 5 is a sectional view of another embodiment of a delivery mechanism.

Figure 1:
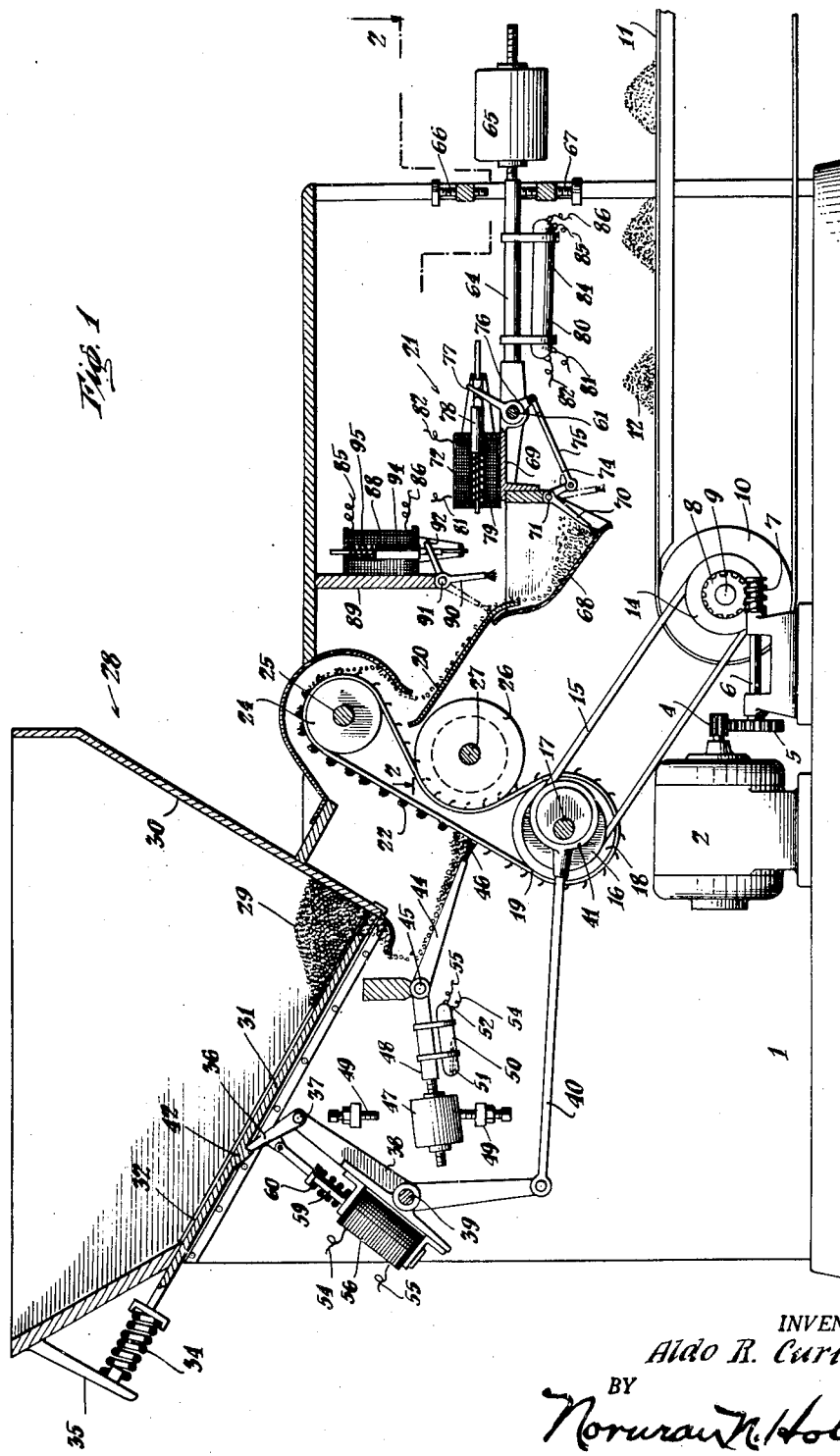
Fig. 1 is a sectional view through the machine illustrating the operation thereof and details of parts of the machine.

Referring again to the drawings illustrating a preferred embodiment of the invention and more particularly to Fig. 1 thereof, there is shown a segregating and weighing machine for macaroni and like products having a frame 1 and cover partially enclosing the working parts of the machine. An electric motor 2 is mounted on the base of the machine and has a gear 4 on its shaft meshing with a gear 5 on shaft 6 mounted in suitable bearings and having a worm gear 7 at its opposite end meshing with a gear 8 on shaft 9. The shaft 9 has secured to it a pulley 10 having a conveying belt 11 thereon for conveying predetermined quantities 12 of macaroni delivered by the weighing device to a wrapping machine or to any other location for the usual packaging. The shaft 9 also has a pulley 14 with a belt 15 thereon extending about a pulley 16 on shaft 17. The shaft 17 has a pulley 18 with a feed belt 19 thereon adapted to receive and deliver macaroni to an inclined chute 20 leading to the receptacle of the weighing device 21. The belt 19 has cleats 22 on its outer surface and extends over a pulley 24 on shaft 25 and about an idler pulley 26 on shaft 27. Thus the motor 2 operates continuously the conveyor 11 which receives the macaroni delivered by the weighing device 21 and also the conveyor 19 which receives the macaroni delivered to it from the storage bin and transfers it in small quantities, preferably one or two sticks at a time to the weighing mechanism.

One of the problems encountered in the automatic handling of macaroni is to prevent breakage of the sticks and to prevent clogging of them. It is quite difficult to remove macaroni from a bin in small quantities for these and other reasons. In the present machine, a bin 28 is shown for receiving quantities of macaroni 29 in bulk. One side 30 of the bin is inclined and leads down to the delivery opening. The adjoining side is closed by a gate 31 slidable in guideways 32. The gate is resiliently pressed toward its closed portion by a spring 34 at its upper end held in position by a member 35 attached to the bin. Macaroni under normal operations would tend to clog at the mouth of the opening in some instances and in other instances to flow out too fast.

In order to obtain optimum results, it is desirable to have the macaroni delivered at a substantially uniform rate. To accomplish this result, the gate 31 is moved back and forth in the guideways 32 by means of a dog 36 pivoted at 37 on a bell crank 38 pivoted at 39 and the spring 34. The opposite end of the bell crank is joined by a rod 40 to an eccentric 41 on the driven shaft 17. As the shaft 17 rotates, the rod 40 reciprocates and in turn oscillates the bell crank 38 causing the dog 36 to engage the projection 42 to raise the gate 31. The gate is returned to its lower position by the spring 34 when the dog 36 is moved in the opposite direction. In this manner, the gate 31 is opened and closed at intervals to prevent clogging of the macaroni. The spring 34 which returns the gate to its closed position is sufficiently resilient to avoid or at least minimize the breakage of the sticks of macaroni.

The macaroni delivered from the bin falls on a member 44 pivoted on a shaft 45 and sloped downwardly toward the conveyor belt 19 for delivering the macaroni thereto. The end of the member 44 has a brush 46 which permits the cleats 22 on the conveyor belt 19 to pass and pick up sticks of macaroni, preferably one or two at a time. If too great a quantity of macaroni is delivered to the pivoted member 44 so that an excess amount rests against the belt 19, there is a tendency for breakage. In addition, the sticks of macaroni may become disarranged, which renders the operation more difficult.

In order to stop or reduce the delivery of the macaroni when a quantity has accumulated, a counterbalance weight 47 is threaded to the member 48 forming an extension of the pivoted member 44 on the opposite side of the pivot 45. Stops 49 are provided on opposite sides of the weight 47 to limit the movement of the member 44. A mercury switch 50 is secured to the member 48 so that the globule of mercury 51, when the weight 47 is in its lower position and the chute or member 44 is in its upper position, is at the left hand of the mercury tube so that it is ineffective to close the electric contacts 52. However, when an excess amount of macaroni is delivered and becomes effective upon the chute or member 44, the weight 47 rises and engages the upper stop 49. In this position, the globule of mercury 51 moves into the opposite end of the tube and closes the contacts 52. The contacts 52 control the electric circuit through wires 54 and 55 leading to the electric magnet 56 mounted on the bell crank 38. The electric magnet has its core 59 connected to the dog 36. When the circuit is closed by the mercury tube 50 through the magnet, the core 59 of the magnet pulls the dog 36 to the left in opposition to the spring 60. This renders the dog 36 ineffective upon the gate 31 and the gate is moved down toward its closed position by the spring 34 which stops the flow of macaroni from the bin.

As the conveyor 19 continues to remove macaroni from the member 44 the quantity thereon is reduced to a point where the weight 47 drops against the lower stop 49 and the mercury switch 50 thereupon opens the circuit through magnet 56. The spring 60 renders the oscillating dog 36 effective to raise and lower the gate 31. In this manner, macaroni is delivered from the bin 29 at a predetermined rate and is not permitted to accumulate in excessive quantities, which would complicate the operation of the machine.

In order to deliver predetermined quantities of macaroni to the conveyor 11, a weighing mechanism 21 is provided. This mechanism comprises a shaft 61 having its ends mounted in bearings 62 (Fig. 2) and having a beam 64 extending on one side thereof with a weight 65 threaded thereto. The position of the weight on the beam determines the quantity of macaroni delivered before the beam is raised. Suitable set screws 66 and 67 limit the upward and downward movement of the scale beam 64. A receptacle 68 is operatively secured to the opposite end 69 of the scale beam extending on the opposite side of the pivot or shaft 61. Hence when the amount of macaroni on the bin 68 reaches a predetermined amount, it raises the scale beam 64 about the shaft 61.

The bottom of the receptacle 68 is normally retained closed by a gate 70 pivoted at 71. The gate 70 is operated by an electric magnet 72, mounted on the part 69 of the scale beam, through arm 74, link 75 and bell crank 76 rotatably mounted on shaft 61. The upper end 77 of the bell crank is operatively connected to the core 78 of the magnet 72. The core 78 is retained in the position shown by a spring 79. When the circuit through the magnet is opened, the gate 70 is closed so that the receptacle may receive and retain macaroni. The control circuit for the magnet is through the mercury switch 80 secured to the scale beam 64 and wires 81 and 82. When the scale beam 64 reaches its upper position in contact with the upper limit stop 66, the globule of mercury 84, which normally closes the contacts through wires 85 and 86 in the opposite end of the switch, moves to the opposite end to close the contacts through wires 81 and 82. The closing of these contacts operates the magnet 72 and draws the core 78 to the left in opposition to spring 79, rotates the bell crank 76 about shaft 61 and moves the gate 70 from its full line position to its dotted line position to drop the macaroni from the receptacle 68 onto the conveyor belt 11 as shown at 12.

It is important to obtain accurate weights, because, where packages are sold in large quantities, a slight increase in the weight of macaroni delivered to the package means a substantial loss in the run of a year. On the other hand, if the weight is too light, the customer is being cheated. In addition, the Government is likely to condemn the packages as being underweight or misbranded, which will occasion a substantial inconvenience and loss to the manufacturer as well as a reflection on his reputation.

In order to increase the accuracy of the device, there is provided a magnet 88 mounted on the bracket 89 to operate a control gate 90 adapted to be moved from full line position to dotted line position to engage the lower end of the chute 20 and stop the delivery of macaroni to the receptacle 68 of the weighing device. The gate 90 pivoted at 91, is connected by arm 92 to the core 94 of the magnet which is urged toward its downward position by a spring 95. A circuit through the magnet 88 is controlled by wires 85 and 86 leading to the mercury switch 80. The inclination of the mercury switch is such that the globule of mercury 84 normally closes the contacts 85, 86 when the beam 64 of the scale is in its lower position, that is, when it is in contact with stop 67 as shown in Fig. 1. The gate 90 is then in its ineffective position. When the scale beam starts to rise, the mercury globule will open the contacts 85, 86 and close contacts 81, 82, causing the magnet 88 to allow the gate 90 to close thus stopping the flow of macaroni to the scale receptacle 68. Thus, when the scale beam starts to rise, the flow of macaroni to the scale is stopped, thereby accurately controlling the weight of the macaroni delivered by the weighing mechanism. Ordinarily, there is ample time for the macaroni to be dropped from the scale bin before the circuit through magnet 72 is opened by switch 80, permitting the spring 79 to close the gate 70. If additional time is required, a delayed operating magnet may be used, or any other suitable means for obtaining the necessary timing of the operations.

While various types of belts may be utilized, the preferred form of conveyor belt 19 is illustrated in Fig. 4. Preferably the belt comprises two widths of cloth or fabric 105 stitched together at intervals as shown at 106, with metal strips 107 enclosed between them. The metal strips have tabs 108 bent outwardly to support strips 109 preferably extending substantially the full width of the conveyor. The strips 109 may be spot welded or otherwise secured to the members 108. The preferred construction is sufficiently sturdy for the purposes and at the same time, the cloth gives a resilience and flexibility which tends to minimize breakage of the sticks of macaroni.

Another form of mechanism is illustrated in Fig. 5 for delivering macaroni from a bin to the conveyor 19. In this construction, a bin 28' has inclined sides for receiving macaroni 29. The delivery of the macaroni is controlled by a gate 31' which may be adjusted in position by means of a handwheel 97 threaded at 98. A member 99 pivoted at 100 is sloped downwardly toward the upwardly inclined conveyor belt 19. The conveyor belt picks up small quantities of macaroni and delivers them to the inclined member 20 (not shown in Fig. 5). The pivoted member 99 is oscillated by means of the member 101 having a roller 102 thereon engaging the irregular cam 104 on shaft 17. The up and down movement of the member 99 prevents clogging at the gate 31' and also at the conveyor belt 19. The embodiment in Fig. 5 is an alternate construction, but the embodiment in Fig. 1 is preferred.

In the operation of the machine macaroni is delivered to the bin 28 in quantities. The gate 31 is normally oscillated to prevent clogging and a substantially uniform stream of macaroni is delivered onto the pivoted member 44 leading to the upwardly moving conveyor belt 19. The gate 31 is oscillated by means of the eccentric 91 effective upon bell crank 38 and dog 36 to raise and lower the gate. When an excess of macaroni has accumulated on the inclined member 44, it drops down raising the weight 47 which in turn operates the mercury switch 50 to close the circuit through the magnet 56. The magnet 56 withdraws the dog 36 and permits the gate 31 to close under the influence of spring 34, thereby stopping the flow of macaroni from the bin until the amount of macaroni on the member 44 is reduced sufficiently for the member 44 to return to its normal position under the influence of the weight 47. The conveyor 19 having cleats 22 delivers the macaroni onto the inclined member 20 which in turn delivers the macaroni to the receptacle 68 of the weighing mechanism 21. When a predetermined quantity of macaroni accumulates in the receptacle 68 it counterbalances the weight 65 on the scale beam thereby raising the scale beam. The mercury switch 80 thereupon opens contacts 85, 86 and breaks the circuit through magnet 88 which permits the gate 90 to move from its full line position to its dotted line position under the influence of spring 95. This stops the flow of macaroni to the receptacle 68. When the globule of mercury reaches the opposite end of the tube 80, it closes the circuit through magnet 72. The magnet 72 through the link mechanism 76, 75 and 74 moves the gate 70 from its full line position to its dotted line position, thereby permitting the macaroni to fall from the receptacle 68 to the conveyor 11. The scale beam then drops to the position shown in Fig. 1 and the circuit is closed through the magnet 88 which opens the gate 90 to repeat the cycle.

It will be seen that the present machine provides an improved mechanism for delivering macaroni at a substantially uniform rate from a bin or receptacle. The mechanism minimizes breakage of the macaroni and clogging of delivery openings. Excess deliveries are prevented and a steady stream of macaroni is supplied to the feeding conveyor. The delivery of macaroni to the weighing mechanism is automatically stopped upon the movement of the scale beam, thereby providing greater accuracy in weighing. The machine is simple in construction, easy to operate and fully capable of segregating and accurately weighing quantities of macaroni. The electric parts are simple and the units are easily replaceable. The machine is fully capable of operating continuously over long periods.

The term "macaroni" is used herein to include macaroni, spaghetti, noodles and products of that general nature. As various other changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. In a device of the class described, the combination of a bin for holding sticks of macaroni and the like, a gate for controlling the transverse flow of sticks of macaroni from the bin, means for oscillating said gate transversely of the sticks to prevent clogging of the macaroni, a chute to which the bin delivers macaroni, and means controlled by the load on the chute to make the oscillating means ineffective.

2. In a device of the class described, the combination of a bin for holding sticks of macaroni and the like, a gate oscillating transversely of the sticks for controlling the transverse flow of sticks of macaroni from the bin, means for so oscillating the gate, automatic means effective through the oscillating means for closing the gate transversely of the sticks when an excess quantity of macaroni has been delivered therefrom.

3. In a device of the class described, the combination of a receptacle for macaroni and the like, a gate for controlling the flow of macaroni from the receptacle, a spring normally tending to close the gate, an oscillatory member for moving said gate in opposition to said spring to prevent the macaroni from clogging, a pivoted member yieldably held in position for receiving the macaroni delivered from the receptacle and electrical means responsive to the position of said yieldable member for rendering said oscillatory member ineffective upon the gate when the amount of macaroni delivered exceeds a predetermined amount.

4. In a device of the class described, the combination of a receptacle for macaroni and the like, a member forming an opening for delivery of the macaroni from the receptacle, means for oscillating said member to change the size of said opening, a pivoted member for receiving the macaroni delivered through said opening, means for yieldably holding said pivoted member in a predetermined position, whereby an excess of macaroni delivered changes the position of said pivoted member, and means responsive to said change in position for rendering said oscillating member ineffective and for reducing the size of said opening.

5. In a device of the class described, the combination of a bin for transversely delivering macaroni and the like, a gate for controlling the transverse flow of macaroni from the bin, an inclined member for receiving the macaroni delivered from the bin including a bristle edge to support the macaroni transversely, a conveyor belt inclined in an upward direction moving past the lower end of said inclined member and including cleats overlapping the bristle end to remove the macaroni from said inclined member and deliver it to another position.

6. In a device of the class described, the combination of a bin for holding sticks of macaroni and the like in transversely disposed position, an inclined lower and movably mounted wall member forming one side of said bin, means adapted to impart a vibratory motion to said inclined wall member to thereby facilitate transverse alignment of said macaroni sticks and movement thereof substantially in said relationship toward and through a discharge opening of said bin, a chute for receiving aligned macaroni sticks from said bin and movable in response to a predetermined weight thereof, and means operatively connecting said chute with said movably mounted wall member to make the movably mounted wall member ineffective thereby to stop the flow of macaroni through said discharge opening upon deposition of an excess weight of macaroni on said chute and corresponding movement of the chute.

ALDO R. CURIONI.

REFERENCES CITED

The following references are of record in the file of this patent:

UNITED STATES PATENTS

| Number | Name | Date |
|---|---|---|
| Re. 11,503 | Wood | July 9, 1895 |
| 368,811 | Childs | Aug. 23, 1887 |
| 561,522 | Richards | June 2, 1896 |
| 792,880 | Casey | June 20, 1905 |
| 804,459 | Ellingwood | Nov. 14, 1905 |
| 807,362 | De Long | Dec. 12, 1905 |
| 861,077 | Bedell | July 23, 1907 |
| 878,847 | Williams | Feb. 11, 1908 |
| 1,088,441 | Morrow | Feb. 24, 1914 |
| 1,134,669 | Chiniquy | Apr. 6, 1915 |
| 1,134,688 | McWhorter | Apr. 6, 1915 |
| 1,325,704 | Scott | Dec. 23, 1919 |
| 1,326,117 | Thomas | Dec. 23, 1919 |
| 1,377,399 | Conte | May 10, 1921 |
| 1,497,576 | Molins | June 10, 1924 |
| 1,558,668 | Carter | Oct. 27, 1925 |
| 1,688,982 | Molins | Oct. 23, 1928 |
| 1,728,429 | Merchen | Sept. 17, 1929 |
| 1,735,472 | O'Neill | Nov. 12, 1929 |
| 1,816,153 | Knight | July 28, 1931 |
| 1,868,404 | Zeigler | July 19, 1932 |
| 1,881,859 | Mullendore | Oct. 11, 1932 |
| 2,100,874 | Ryan et al. | Nov. 30, 1937 |
| 2,139,903 | Mason et al. | Dec. 13, 1938 |
| 2,212,419 | Harmon | Aug. 20, 1940 |
| 2,226,236 | Bleam | Dec. 24, 1940 |
| 2,270,083 | Rapp | Jan. 13, 1942 |
| 2,276,382 | Francis | Mar. 17, 1942 |
| 2,286,554 | Lieberman | June 16, 1942 |
| 2,294,551 | Guest | Sept. 1, 1942 |

FOREIGN PATENTS

| Number | Country | Date |
|---|---|---|
| 18,179 | Australia | 1934 |
| 9,371 | Great Britain | 1914 |
| 403,936 | Great Britain | Apr. 1, 1932 |